United States Patent
Zhang et al.

(10) Patent No.: US 8,214,493 B2
(45) Date of Patent: Jul. 3, 2012

(54) APPARATUS AND METHOD FOR CONTROLLING FLOW OF A SERVICE NODE

(75) Inventors: Zhiming Zhang, Shenzhen (CN); Zheng Liu, Shenzhen (CN); Dengbao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 171 days.

(21) Appl. No.: 12/718,472

(22) Filed: Mar. 5, 2010

(65) Prior Publication Data

US 2010/0205296 A1   Aug. 12, 2010

Related U.S. Application Data

(63) Continuation of application No. PCT/CN2008/072251, filed on Sep. 3, 2008.

(30) Foreign Application Priority Data

Sep. 5, 2007  (CN) .......................... 2007 1 0145798

(51) Int. Cl.
*G06F 13/00* (2006.01)

(52) U.S. Cl. ....................................... 709/224
(58) Field of Classification Search .................. 709/224
See application file for complete search history.

(56) References Cited

U.S. PATENT DOCUMENTS

| | | |
|---|---|---|
| 2002/0089931 A1 | 7/2002 | Takada et al. |
| 2003/0097461 A1 | 5/2003 | Barham et al. |
| 2003/0112814 A1 | 6/2003 | Modali et al. |

FOREIGN PATENT DOCUMENTS

| | | |
|---|---|---|
| CN | 1477823 A | 2/2004 |
| CN | 1536798 A | 10/2004 |
| CN | 1627745 A | 6/2005 |
| CN | 1754335 A | 3/2006 |

(Continued)

OTHER PUBLICATIONS

1st Office Action in corresponding Chinese Application No. 200710145798.9 (May 8, 2009).
Extended European Search Report in corresponding European Application No. 08800763.8 (Dec. 2, 2010).
Written Opinion of the International Search Report in corresponding PCT Application No. PCT/CN2008/072251 (Dec. 4, 2008).

(Continued)

*Primary Examiner* — Robert B Harrell
(74) *Attorney, Agent, or Firm* — Leydig, Voit & Mayer, Ltd.

(57) ABSTRACT

A flow control apparatus includes a status monitoring unit, a flow control deciding unit, a flow control strategy storing unit and a performing unit. The status monitoring unit is configured to report the current operating status of a service node to the flow control deciding unit. The flow control deciding unit is configured to provide the current operating status of the service node to the flow control strategy storing unit, generate a flow control command based on an evaluating result which is obtained by the flow control strategy storing unit based on one or more flow control algorithms and the current operating status of the service node, and distribute the flow control command. The flow control strategy storing unit is configured to store the one or more flow control algorithms, obtain the evaluating result based on the one or more flow control algorithms and the current operating status of the service node provided by the flow control deciding unit, and provide the evaluating result to the flow control deciding unit. The performing unit is configured to control new services arriving at a service processing system according to the flow control command distributed by the flow control deciding unit. A flow control method is also provided.

7 Claims, 5 Drawing Sheets

FOREIGN PATENT DOCUMENTS

| | | |
|---|---|---|
| CN | 1859152 A | 11/2006 |
| CN | 101127713 A | 2/2008 |
| CN | 101127713 B | 4/2011 |
| EP | 1641232 A1 | 3/2006 |
| WO | WO 02/05068 A2 | 1/2002 |

OTHER PUBLICATIONS

International Search Report in corresponding PCT Application No. PCT/CN2008/072251 (Dec. 4, 2008).

$1^{st}$ Office Action in corresponding European Application No. 08800763.8 (Oct. 6, 2011).

APPARATUS AND METHOD FOR CONTROLLING FLOW OF A SERVICE NODE

CROSS-REFERENCE TO RELATED APPLICATIONS

This application is a continuation of International Application No. PCT/CN2008/072251, filed on 3 Sep. 2008, which claims priority to Chinese Patent Application No. 200710145798.9 filed on Sep. 5, 2007, both of which are hereby incorporated by reference in their entireties.

FIELD OF THE INVENTION

The present invention relates to a network technique, and more particularly, to a flow control technique.

BACKGROUND

With the development of network techniques and services, the number of users and the traffic in a network are rapidly increasing. At some specific time points and in some specific cases, the traffic at some service nodes in a service processing system may go beyond a practical processing capability, such that it may be possible to make the operation of the service nodes slow or even crash, thus resulting in service interruption. The service processing system refers to a system capable of processing services.

Currently, a person skilled in the art generally employs flow control techniques to resolve the problem that the operation of a service node is slow due to overflow.

In one of flow control methods, there is a fixed mapping relationship between an preset overload threshold and abandoned traffic. A prescribed proportion of services will be abandoned when a load index reaches or exceeds the preset overload threshold. As shown in FIG. 1, taking call services for example, when the load index of a certain service node reaches or exceeds the preset overload threshold, all the new calls exceeding the preset overload threshold are abandoned.

In another one of flow control methods, a plurality of overload thresholds are set, and an interval between every two overload thresholds corresponds to a prescribed proportion of services to be abandoned. When a load index is within an interval between every two adjacent overload thresholds, a proportion of services corresponding to the interval is abandoned. As shown in FIG. 2, still taking call services for example, when a load index of a certain service node reaches an interval between Overload Threshold 1 and Overload Threshold 2, a proportion of 35% of the service may be abandoned. When a load index of a certain service node reaches an interval between the Overload Threshold 2 and Overload Threshold 3, a proportion of 85% of the service may be abandoned.

During the implementation of the present invention, it is found that, although the above two flow control methods may realize a flow control, the above two flow control methods are highly coupled with products in practical application. In other words, implementation codes of the above two flow control methods are respectively integrated with implementation codes of relevant products. In this case, both of the above two flow control methods are not transplantable, i.e. it is impossible to conveniently transplant a flow control method for a product into another product. In addition, on the premise that implementation codes of a product are not modified, it is impossible to change or extend a flow control method. Certainly, at present, there is no feasible flow control architecture, which is separated from a service processing system, for conveniently performing a flow control on any product.

SUMMARY

A technical problem to be resolved by embodiments of the present invention is to provide a flow control apparatus and a flow control method, so as to provide a flow control apparatus and a flow control method which are separated from a service processing system.

In order to resolve the above technical problem, a flow control apparatus is provided, which includes a flow control apparatus, comprising a status monitoring unit, a flow control deciding unit, a flow control strategy storing unit and a performing unit. The status monitoring unit is configured to monitor an operating status of a service node in a service processing system and report the operating status, currently monitored, of the service node to the flow control deciding unit. The flow control deciding unit is configured to provide the operating status, currently monitored, of the service node to the flow control strategy storing unit, generate a flow control command based on an evaluating result which is obtained by the flow control strategy storing unit based on one or more flow control algorithms and the operating status, currently monitored, of the service node, and distribute the flow control command. The flow control strategy storing unit is configured to store the one or more flow control algorithms, obtain the evaluating result based on the one or more flow control algorithms and the operating status, currently monitored, of the service node provided by the flow control deciding unit, and provide the evaluating result to the flow control deciding unit. The performing unit is configured to control new services arriving at the service processing system according to the flow control command distributed by the flow control deciding unit.

Furthermore, a flow control method is provided, which is applied in a network architecture separated from a service processing system and includes: obtaining an operating status, currently monitored, of a service node in the service processing system; obtaining an evaluating result based on the operating status currently monitored and one or more flow control algorithms; and controlling new services arriving at the service processing system based on the evaluating result.

In the flow control apparatus according to an embodiment of the present invention, new services arriving at the service processing system may be controlled by the status monitoring unit, the flow control deciding unit, the flow control strategy storing unit and the performing unit, and these units may be presented independently from the service processing system. Therefore, the flow control apparatus according to an embodiment of the present invention is an apparatus embodiment which is separated from the service processing system and may perform a flow control efficiently.

The flow control method according to an embodiment of the present invention may be applied in a network architecture which is separated from a service process system. In other words, the steps of obtaining the operating status, obtaining the evaluating result and controlling the new services are performed independently from the service processing system, so that the flow control method is not merged into the service processing system. That is, this flow control method may perform a flow control on any service processing system, and thus a flow control method and service processing systems may be separated from each other.

DETAILED DESCRIPTION

A flow control method according to an embodiment of the present invention will be described now. The method according to the embodiment of the present invention is applied in a network architecture which is separated from a service processing system. The method according to the embodiment of the present invention includes: obtaining an operating status, currently monitored, of a service node in the service processing system; obtaining an evaluating result based on the operating status currently monitored and one or more flow control algorithms; and controlling new services arriving at the service processing system based on the evaluating result. It should be noted that, when obtaining the evaluating result based on the operating status currently monitored and the one or more flow control algorithms, the evaluating result may be selected from evaluating results respectively obtained based on each flow control algorithm or may be obtained by synthesizing all the evaluating results.

Specifically, the evaluating result may be obtained based on the operating status currently monitored and the one or more flow control algorithms through: obtaining the evaluating result by comparing the operating status, currently monitored, of the service node with a previously-obtained operating status of the service node.

Furthermore, the evaluating result may also be obtained based on the operating status currently monitored and the one or more flow control algorithms through: obtaining the evaluating result by comparing the operating status, currently monitored, of the service node with a preset overload start threshold and/or a preset overload restore threshold. The preset overload start threshold is used as a criterion for judging whether to abandon new services, and the preset overload restore threshold is used as a criterion for judging whether to decrease a proportion of abandoned new services or stop abandoning any new service. The preset overload restore threshold is lower than the preset overload start threshold.

The flow control method according to the embodiment of the present invention will be described now with reference to the drawings.

Figure 1:
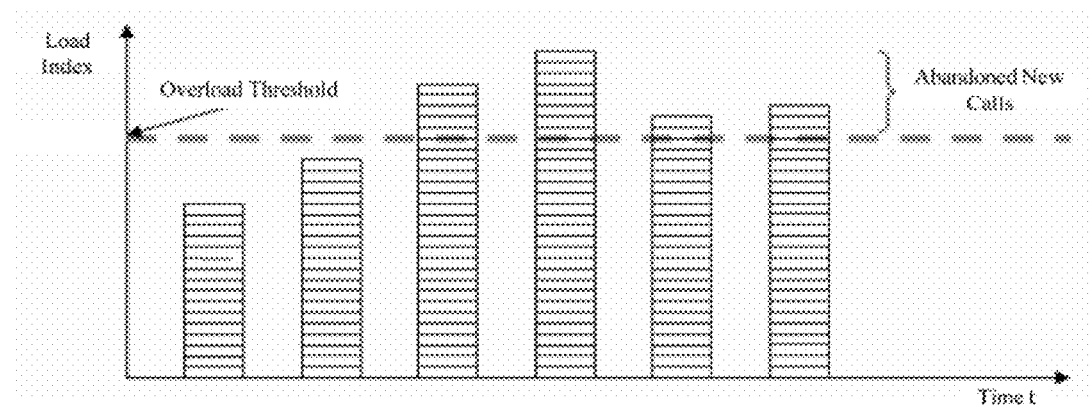
FIG. 1 is a schematic diagram of an existing flow control technique.
Figure 2:
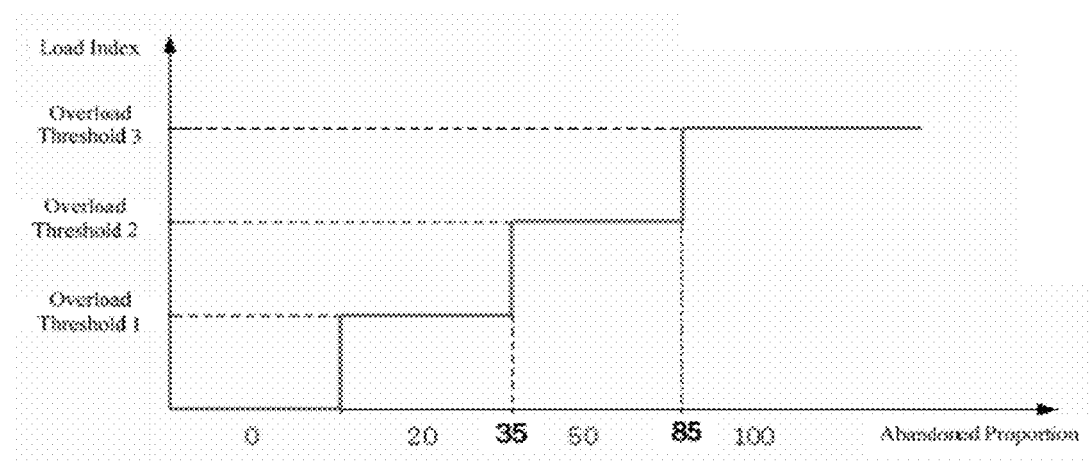
FIG. 2 is a schematic diagram of another existing flow control technique.
Figure 3:
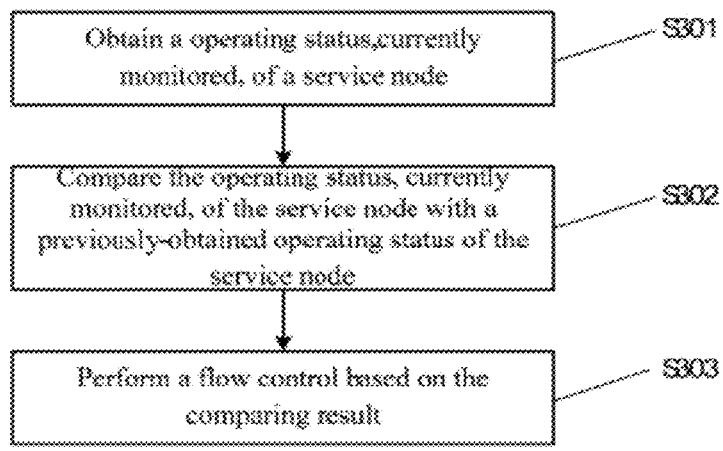
FIG. 3 is a flowchart of a flow control method according to an embodiment of the present invention.

FIG. 3 is a flowchart of a flow control method according to an embodiment of the present invention. As shown in FIG. 3, the flow control method includes the following steps.

Step S301: An operating status, currently monitored, of a service node is obtained.

Specifically, the operating status of the service node may be obtained from the service node itself, and the operating status of the service node may also be obtained from other network entities. Certainly, the operating status of the service node may also be obtained by other means which are not enumerated here any more. The operating status of the service node may be a load status of the service node, such as CPU occupying rate, and higher load of the service node indicates worse operating status of the service node. The operating status of the service node may also be a message processing time which may refer to a delay from receiving a message to feeding back to the message, and longer message processing time indicates worse operating status of the service node. Certainly, the operating status of the service node may also be expressed by other parameters which are not enumerated here any more.

Step S302: The operating status, currently monitored, of the service node is compared with a previously-obtained operating status of the service node.

In fact, once an operating status currently monitored is obtained, this operating status, currently monitored, may be stored. When a new operating status is obtained, the new operating status may be compared with the previously-obtained operating status so as to determine whether there is a change between the operating statuses.

Step S303: A flow control is preformed based on the comparing result.

Through comparing the operating status currently monitored with the previously-obtained operating status, it can be determined whether a change between the operating statuses occurs and what kind of change occurs if the change occurs.

Specifically, if the operating status currently monitored is better than the previously-obtained operating status and it has been previously started to abandon new services, the proportion of abandoned new services is decreased or the abandonment of any new service is stopped. If the operating status currently monitored is worse than the previously-obtained operating status, the proportion of the abandoned new services is increased or the abandonment of the new services is started. If the operating status currently monitored is better than the previously-obtained operating status and a certain proportion of the new services has been previously abandoned, which indicates that an operating condition of the service node is improved due to the abandoning of the new services, the proportion of the abandoned new services may be appropriately decreased, or even any new service may not be abandoned any longer. If the operating status currently monitored is better than the previously-obtained operating status and any new service has not been previously abandoned, which indicates that the operating condition of the service node is better than a previous operating condition, there is no need to perform a flow adjustment and all the new services may still be continuously accepted. If the operating status currently monitored is worse than the previously-obtained operating status and a certain proportion of the new services has been previously abandoned, which indicates that the operating condition of the service node is not improved through abandoning the proportion of the new services, the proportion of the abandoned new services may be increased so as to improve the operating condition of the service node as soon as possible. If the operating status currently monitored is worse than the previously-obtained operating status and any new service has not been previously abandoned, a certain proportion of the new services may be abandoned; however, this means is optional. For example, although it is known that the current operating condition of the service node is worse than the previous operating condition of the service node, the service node may still have an capability to process a certain number of new services, and thus it is not necessary to utilize the means of abandoning the new services to improve the operating condition of the service node.

As mentioned in the discussion related to the step of S301, the operating status of the service node may be a load status of the service node. When the current load status is lower than the previous load status, it is indicated that the operating status currently monitored is better than the previously-obtained operating status, and when the current load status is higher than the previous load status, it is indicated that the operating status currently monitored is worse than the previously-obtained operating status. In addition, the operating status of the service node may also be a message processing time. When the current message processing time of the service node is shorter than the previous message processing time, it is indicated that the operating status currently monitored is better than the previously-obtained operating status, and when the current message processing time of the service node is longer than the previous message processing time, it is indicated that the operating status currently monitored is worse than the previously-obtained operating status.

Moreover, as mentioned in the above, when the current operating condition of the service node is worse than the previous operating condition, the service node may have a capability to process new services. However, there is still a possibility that the service node really does not have the capability to process any new service. In this case, when it is determined that the current operating condition of the service node is worse than the previous operating condition, whether to abandon the new services may be selected randomly or based on actual requirement. However, considering that the operating status of the service node often changes, for the sake of convenient management, a threshold may be set as a criterion for judging whether to abandon the new services, which is referred to as the preset overload start threshold. For example, if a current load status is higher than a previous load status, any new service has not been previously abandoned, and the current load status has reached or exceeded the preset overload start threshold, the abandonment of a certain proportion of new services may be started. If the current load status is higher than the previous load status, any new service has not been previously abandoned, and the current load status has not reached or exceeded the preset overload start threshold, any new service may not be abandoned and all the new services may be continuously accepted.

Similarly, if the current operating condition of the service node is better than the previous operating condition, the proportion of the abandoned new services may be decreased. In this case, the proportion of the abandoned new services may be selected randomly or based on actual requirement. However, there is still a possibility that the operating status, currently monitored, of the service node gets better to an extent capable of processing the new services. If the new services are further abandoned, service loss may be caused. Therefore, for the sake of convenient management, a threshold may be set as a criterion for judging whether to decrease a proportion of the abandoned new services or stop abandoning any new service, which is referred to as the preset overload restore threshold. For example, if a current load status is lower than a previous load status, a certain proportion of new services has been previously abandoned, and the current load status has reached or is lower than the preset overload restore threshold, the proportion of the abandoned new services may be decreased or the abandoning of the new services may be stopped. If the current load status is lower than the previous load status, a certain proportion of the new services has been previously abandoned, and the current load status has not reached or is not lower than the preset overload restore threshold, the proportion of the abandoned new services may be still maintained. It should be noted that the preset overload restore threshold is lower than the preset overload start threshold.

Apparently, it may be possible to combine the above manner of comparing operating statuses with the above manner of setting the preset overload start threshold and the preset overload restore threshold.

Figure 4:
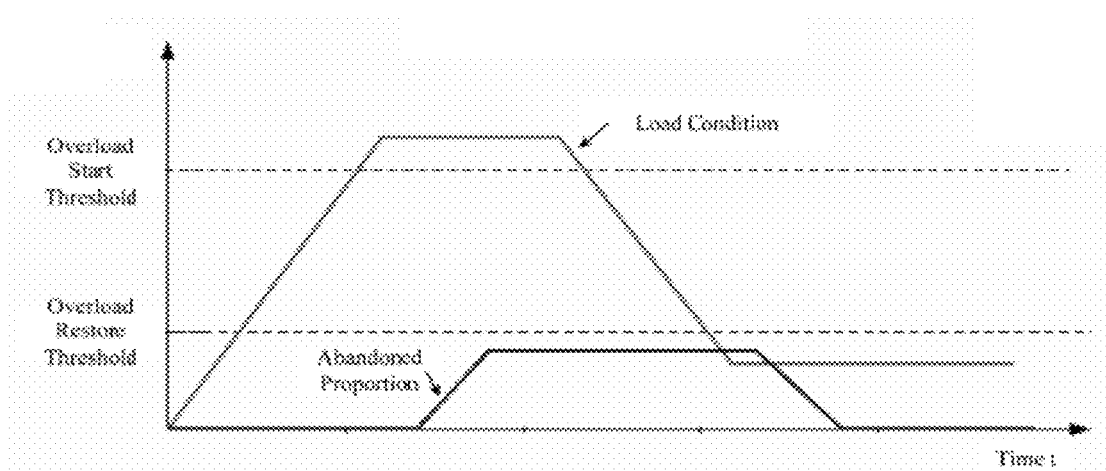
FIG. 4 is a schematic diagram of an embodiment of the present invention in which it is decided to start to abandon or accept new services based on thresholds.

FIG. 4 shows how to decide whether to start to abandon new services or whether to increase or decrease a proportion of the abandoned new services according to thresholds. As shown in FIG. 4, the abandonment of the new services is started when a load index exceeds the preset overload start threshold, and the abandoned proportion is increased as the load index is further increased. The abandoned proportion becomes stable as the load index tends to be stable. The abandoned proportion is decreased when the load index is decreased to reach or be lower than the preset overload restore threshold. Certainly, a delay in practical applications is considered in FIG. 4, and thus a time point at which the abandoned proportion starts to change lags behind a time point at which the load index starts to change, as shown in FIG. 4. In practical applications, if the delay is relatively small and does not affect the implementation of the procedure, such a delay may be neglected. It should be noted that, when the load index tends to be stable, the service node is still processing the received services, and these received services will not be a load of the service node any longer as the processing of the received services is implemented. When the abandoned proportion becomes stable, the burden of the service node for processing new services is alleviated in substance.

Furthermore, an embodiment of the present invention also provides a flow control apparatus independent from a service processing system.

Figure 5:
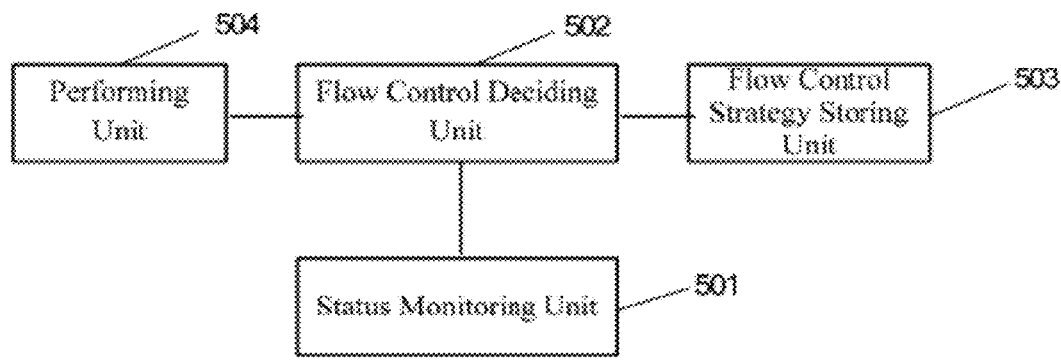
FIG. 5 is a schematic diagram of a flow control apparatus according to an embodiment of the present invention.

As shown in FIG. 5, the flow control apparatus includes a status monitoring unit 501, a flow control deciding unit 502, a flow control strategy storing unit 503 and a performing unit 504. The status monitoring unit 501 is configured to monitor an operating status of a service node in the service processing system, and report the operating status, currently monitored, of the service node to the flow control deciding unit 502. The flow control deciding unit 502 is configured to provide the operating status, currently monitored, of the service node to the flow control strategy storing unit 503, generate a flow control command based on an evaluating result which is obtained by the flow control strategy storing unit 503 based on one or more flow control algorithms and the operating status, currently monitored, of the service node, and distribute the flow control command. The flow control strategy storing unit 503 is configured to store the one or more flow control algorithms, obtain the evaluating result based on the one or more flow control algorithms and the operating status, currently monitored, of the service node provided by the flow control deciding unit 502, and provide the evaluating result to the flow control deciding unit 502. The performing unit 504 is configured to control new services arriving at the service processing system according to the flow control command distributed by the flow control deciding unit 502.

The flow control strategy storing unit 503 is configured to obtain the evaluating result based on the one or more flow control algorithms and the operating status, currently monitored, of the service node provided by the flow control deciding unit 502 through: obtaining the evaluating result by comparing the operating status, currently monitored, of the service node with a previously-obtained operating status of the service node.

The flow control deciding unit 502 is configured to generate the flow control command based on the evaluating result through: generating the flow control command for decreasing a proportion of the abandoned new services or stopping abandoning any new service, if the evaluating result indicates that the operating status currently monitored is better than the previously-obtained operating status and the performing unit 504 has been previously required to start to abandon the new services; and generating the flow control command for increasing the proportion of the abandoned new services or starting to abandon the new services, if the evaluating result indicates that the operating status currently monitored is worse than the previously-obtained operating status.

The flow control strategy storing unit 503 is configured to obtain the evaluating result based on the one or more flow control algorithms and the operating status, currently monitored, of the service node provided by the flow control deciding unit 502 through: obtaining the evaluating result by comparing the operating status, currently monitored, of the service node with a preset overload start threshold and/or a preset overload restore threshold, wherein the preset overload restore threshold is lower than the preset overload start threshold.

The flow control deciding unit 502 is configured to generate the flow control command based on the evaluating result through: generating the flow control command for starting to abandon the new services, if the evaluating result indicates that the operating status, currently monitored, reaches or exceeds the preset overload start threshold and it has not been previously required to abandon any new service; and generating the flow control command for stopping abandoning any new service, if the evaluating result indicates that the operating status, currently monitored, reaches or is lower than the preset overload restore threshold and it has been previously required to abandon the new services.

The performing unit 504 is configured to control the new services based on the flow control command distributed by the flow control deciding unit 502 through: requiring the service processing system to accept partial of the current new services when the service processing system receives the new services, if the flow control command requires to decrease the proportion of the abandoned new services; requiring the service processing system to accept the current new services when the service processing system receives the new services, if the flow control command requires to stop abandoning any new service; requiring the service processing system to refuse to accept the current new services or temporarily store but not process the current new services when the service processing system receives the new services, if the flow control command requires to increase the proportion of the abandoned new services or start to abandon the new services; and requiring the service processing system to accept or not to accept a number of new services, which correspond to an increased proportion of the abandoned new services or a proportion of the new services being abandoned, from a certain number of new services, if the flow control command not only requires to increase the proportion of the abandoned new services or start to abandon the new services but also indicates the increased proportion of the abandoned new services or the proportion of the new services being abandoned, wherein not to accept the new services refers to temporarily store but not process the new services or refers to refuse to accept the new services.

The operating status of the service node may be a load status of the service node or a message processing time of the service node.

In addition, in the embodiment shown in FIG. 5, the flow control deciding unit 502 may not provide the operating status of the service node to the flow control strategy storing unit 503. Instead, the flow control strategy storing unit 503 may provide at least one algorithm to the flow control deciding unit 502, and the flow control deciding unit 502 obtains an evaluating result based on the at least one algorithm and then generates a flow control command based on the evaluating result. Moreover, the flow control strategy storing unit 503 may make decisions to start to abandon new services, provide a proportion of the abandoned new services, decrease the proportion of the abandoned new services, and stop abandoning any new service. In this case, the evaluating result is the decisions to start to abandon the new services, provide the proportion of the abandoned new services, decrease the proportion of the abandoned new services, stop abandoning any new service, and so on. The flow control deciding unit 502 may generate and distribute the flow control command only based on these decisions.

If the embodiment shown in FIG. 5 is implemented by software, two parts, i.e. a kernel and a shell, will be involved. Specifically, the status monitoring unit 501, the flow control deciding unit 502 and the performing unit 504 may have a kernel respectively. The kernel is presented in a form of dynamic link library which is similar to library function. The kernel of the status monitoring unit 501 may implement functions of collecting/aggregating operating status of a service node, and so on. The kernel of the flow control deciding unit 502 may implement functions of evaluating an overload status, distributing a flow control command, and so on. The kernel of the performing unit 504 may implement functions of filtering services, and so on. In addition, the kernels of the status monitoring unit 501, the flow control deciding unit 502 and the performing unit 504 may cooperate to run in one shell or may respectively run in respective shells. The shell is provided by a product integrated as that shown in FIG. 5, and implemented as a communication interface, a timer interface or a driver kernel provided for the kernels.

Figure 6:
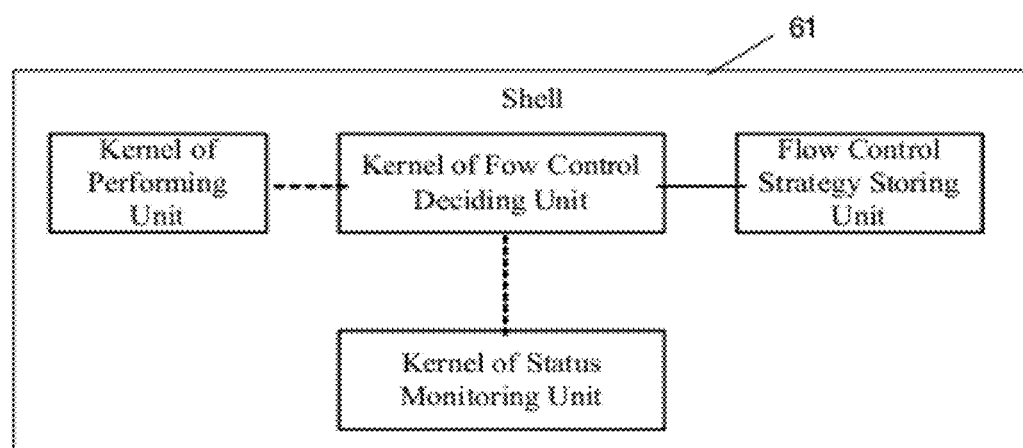
FIG. 6 is a schematic diagram of an embodiment of the present invention in which a plurality of kernels are integrated into a shell.
Figure 7:
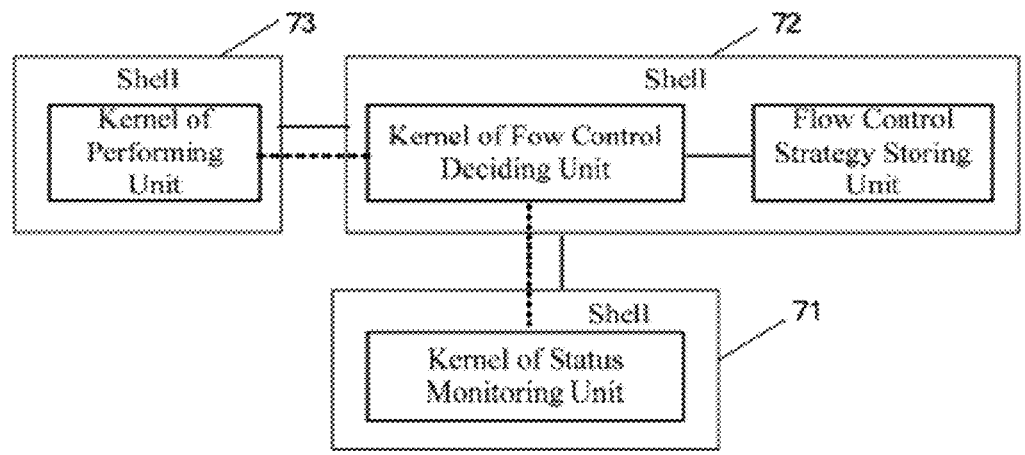
FIG. 7 is a schematic diagram of an embodiment of the present invention in which a plurality of kernels are respectively integrated into respective shells.

Certainly, according to different application conditions and requirements, a plurality of kernels may be integrated into one process by a unitary shell, or each of the plurality of kernels may be respectively integrated into different processes through a plurality of shells. As shown in FIG. 6, the kernel of the status monitoring unit 501, the kernel of the flow control deciding unit 502 and the kernel of the performing unit 504 are integrated into a shell 61. As shown in FIG. 7, the kernel of the status monitoring unit 501, the kernel of the flow control deciding unit 502 and the kernel of the performing unit 504 are integrated into a shell 71, a shell 72 and a shell 73, respectively. It should be noted that, in anyone of the conditions, the flow control strategy storing unit 503 may be directly loaded and invoked by the flow control deciding unit 502, and thus the flow control strategy storing unit 503 may not need a shell. In specific implementation, the loading and invoking between the flow control deciding unit 502 and the flow control strategy storing unit 503 may be implemented by using a function. In fact, the flow control strategy storing unit 503 may be directly loaded and invoked by any kernel of the flow control deciding unit 502, so that a flow control algorithm provided by the flow control strategy storing unit 503 may serve in any flow control apparatus and is independent from a flow control apparatus. In addition, the kernel of the status monitoring unit 501, the kernel of the flow control deciding unit 502 and the kernel of the performing unit 504 may interact with each other through communication interfaces (not illustrated).

Figure 8:
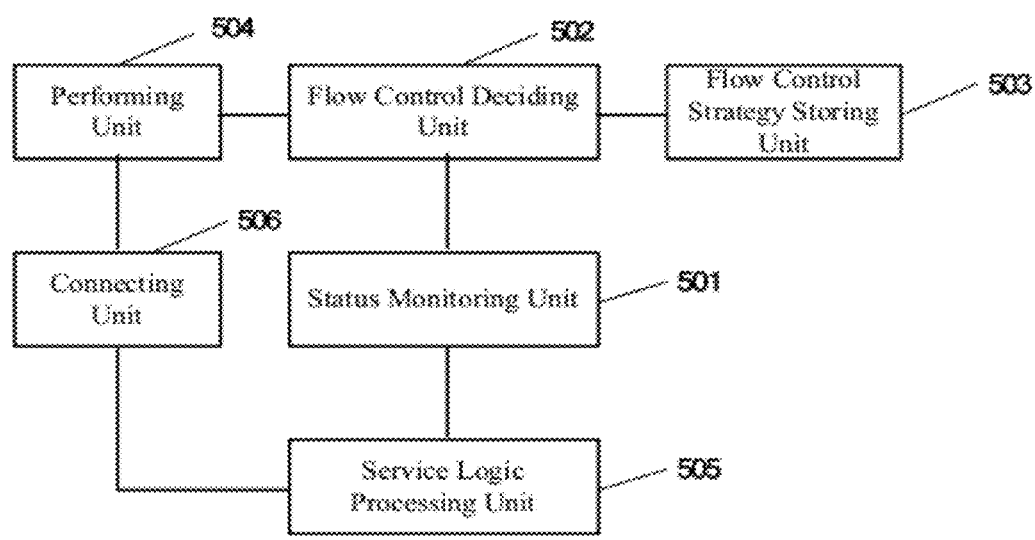
FIG. 8 is a schematic diagram of a service processing system according to a first embodiment of the present invention.

The apparatus shown in FIG. 5 may perform a flow control on any service processing system. Specifically, as shown in FIG. 8, what the status monitoring unit 501 monitors is an operating status of a service logic processing unit 505, what the flow control strategy storing unit 503 (or the flow control deciding unit 502) evaluates is an overload status of the service logic processing unit 505, and what the flow control strategy storing unit 503 distributes is a flow control command for the flow of the service logic processing unit 505. When receiving new services, a connecting unit 506 may invoke a filtering interface of the performing unit 504 to filter the new services, and accept or end the new services according to the flow control command of the performing unit 504. For example, if the performing unit 504 requires the connecting unit 506 to refuse to accept the new services, the connecting unit 506 may temporarily store the new service; and if the performing unit 504 requires the connecting unit 506 to accept the new services, the connecting unit 506 may directly transfer the new services to the service logic processing unit 505. It can be seen apparently from the above description that, the service logic processing unit 505 and the connecting unit 506 may be regarded as parts of the service processing system, or certainly, regarded as a service processing system with a simple structure.

It should be noted that, the above services may only refer to call services, and correspondingly, new services may refer to new calls.

Next, taking call services for example, relevant system start-up process, information collecting process and flow control process will be described with reference to FIG. 8.

1. System Start-Up Process (Loading a Flow Control Strategy)

After starting up, the flow control deciding unit 502 loads a flow control algorithm from the flow control strategy storing unit 503.

2. Information Collecting Process (1) The status monitoring unit 501 collects an operating status of the service logic processing unit 505 at a regular interval (for example, every 20 minutes), and reports the operating status of the service logic processing unit 505 to the flow control deciding unit 502. Certainly, the status monitoring unit 501 may not collect the operating status of the service logic processing unit 505 at a regular interval. For example, the status monitoring unit 501 may collect the operating status of the service logic processing unit 505 at an interval, which specifically refers to a non-periodical interval, for example, sometimes an interval of 20 minutes, or sometimes an interval of 30 minutes.

(2) The flow control deciding unit 502 provides the operating status reported by the status monitoring unit 501 to the flow control strategy storing unit 503.

(3) The flow control strategy storing unit 503 may obtain an evaluating result by comparing the operating status, currently monitored, of the service node with a previously-obtained operating status of the service node. The evaluating result may be a load condition with respect to the service logic processing unit 505 and/or an increased or decreased passing proportion of calls suggested for the flow control deciding unit 502, which may be represented in a form of percentage (%).

(4) The flow control deciding unit 502 generates a flow control command based on the evaluating result fed back by the flow control strategy storing unit 503, and distributes the flow control command to the performing unit 504. If the flow control strategy storing unit 503 does not provide the increased or decreased passing proportion of the calls, the flow control deciding unit 502 may determine an increased or decreased passing proportion of the calls based on the load condition of the service logic processing unit 505.

3. Flow Control Process (1) After receiving the new calls, the connecting unit 506 invokes the filter interface of the performing unit 504 to filter the new calls.

(2) The performing unit 504 determines whether to accept or refuse the new calls based on the flow control command distributed by the flow control deciding unit 502 and the current status (such as, an acceptance/refusal count).

(3) When the performing unit 504 requires to accept the new calls, the connecting unit 506 forwards the new calls to the service logic processing unit 505, or otherwise, the connecting unit 506 ends the new calls or temporarily stores the new calls.

It should be noted that, a plurality of different flow control algorithms may be stored in the flow control strategy storing unit 503. When a new algorithm is to be used, it is only needed to add the new algorithm to the flow control strategy storing unit 503 and almost no amendment needs to be made to the original codes.

Next, two embodiments of a service processing system employing a flow control apparatus according to the present invention will be described with reference to FIGS. 9 and 10.

Figure 9:
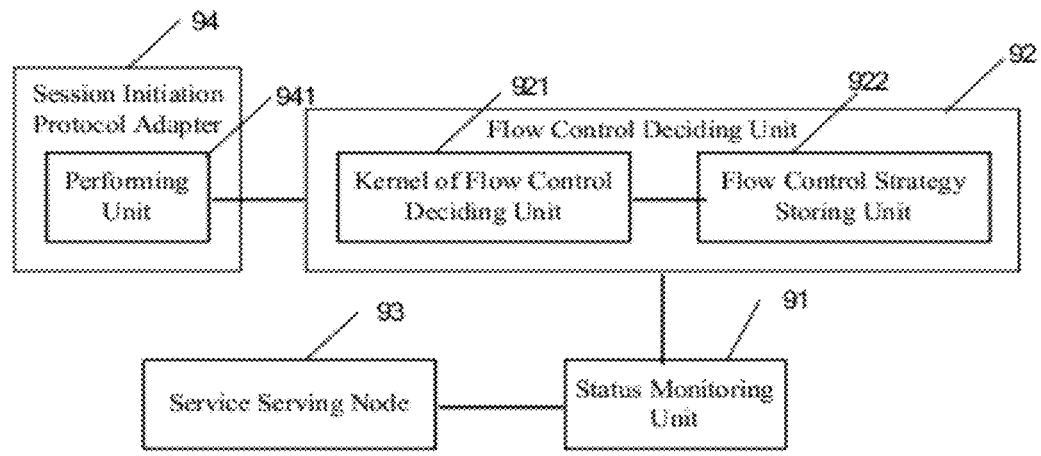
FIG. 9 is a schematic diagram of a service processing system according to a second embodiment of the present invention.

The first embodiment of the service processing system is shown in FIG. 9. A performing unit 941 is integrated into a session initiation protocol adapter 94 in a form of dynamic link library in which the session initiation protocol adapter 94 is equivalent to the connecting unit 506 shown in FIG. 8. A flow control strategy storing unit 922 is integrated into an independent flow control deciding unit 92 in a form of dynamic link library. A status monitoring unit 91 is also an independent process. A service serving node 93 is equivalent to the service logic process unit 505 shown in FIG. 8.

Taking a service message for example, relevant system start-up process, information collecting process and flow control process are as follows.

1. System Start-Up Process (Loading a Flow Control Strategy)

After starting up, the flow control deciding unit 92 loads a flow control algorithm from the flow control strategy storing unit 922.

2. Information Collecting Process (1) The status monitoring unit 91 collects an operating status of the service serving node 93 and reports the operating status to the flow control deciding unit 92. The operating status includes, but not limits to, a CPU occupying rate, a message processing time, and so on.

(2) A kernel 921 of the flow control deciding unit 92 provides the operating status to the flow control strategy storing unit 922.

(3) The flow control strategy storing unit 922 evaluates a load condition of the service serving node 93 based on the operating status. For example, an accepted proportion of the service message is decreased if the load is higher than a preset start threshold, and the accepted proportion of the service message is increased if the load is lower than a preset restore threshold, in which the start threshold is higher than the restore threshold. After evaluating, the flow control strategy storing unit 922 feeds back the evaluating result to the kernel 921 of the flow control deciding unit 92.

(4) The flow control deciding unit 92 generates a flow control command based on the fed back evaluating result from algorithms, and distributes the flow control command to the performing unit 941 in the session initiation protocol adapter 94.

3. Flow Control Process (1) After receiving the new service message, the session initiation protocol adapter 94 invokes a filter interface of the performing unit 941 to filter the new service message.

(2) The performing unit 941 determines whether to accept or refuse the new service message based on the flow control command distributed by the flow control deciding unit 92 and the current status (for example, an acceptance/refusal count).

(3) When the performing unit 941 requires to accept the new service message, the session initiation protocol adapter 94 forwards the new service message to the service serving node 93, or otherwise, the session initiation protocol adapter 94 does not forward the new service message to the service serving node 93 or temporarily stores the new service message.

Figure 10:
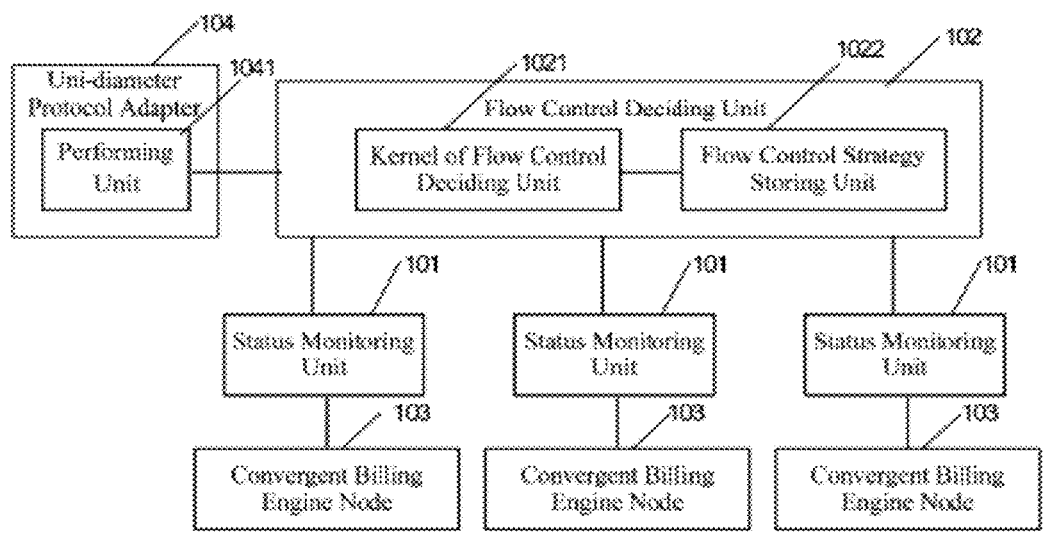
FIG. 10 is a schematic diagram of a service processing system according to a third embodiment of the present invention.

The second embodiment of the service processing system is shown in FIG. 10. A performing unit 1041 is integrated into a uni-diameter protocol adapter 104 in a form of dynamic link library, and the uni-diameter protocol adapter 104 is equivalent to the connecting unit 506 shown in FIG. 8. A flow control strategy storing unit 1022 is integrated into an independent flow control deciding unit 102 in a form of dynamic link library. Each status monitoring unit 101 is also an independent process, and respectively monitors each convergent billing engine node 103. The convergent billing engine node 103 is equivalent to the service logic process unit 505 as shown in FIG. 8.

The relevant system start-up process, information collecting process and flow control process according to the second embodiment is substantially the same as those shown in FIG. 9, except that the flow control deciding unit 102 needs to aggregate evaluating results respectively related to each convergent billing engine node 103, generate a flow control command according to the evaluating results, and distribute the flow control command to the performing unit 1041. It should be noted that, the flow control deciding unit 102 may generate flow control commands respectively related to each convergent billing engine node 103, and in this case, the performing unit 1041 needs to respectively perform a flow control on each convergent billing engine node 103 according to each flow control command. If the flow control deciding unit 102 only generates one flow control command related to all the convergent billing engine nodes 103, the performing unit 1041 comprehensively performs a flow control on all the convergent billing engine nodes 103.

As for specific implementation, the above flow control method and the above flow control apparatus may have no necessary relation with a specific service. In other words, the flow control method and the flow control apparatus may be separated from a product (for example, a service node). When writing codes, it is not needed to merge codes of the flow control method and apparatus into codes of the product. Therefore, the flow control method and the flow control apparatus according to the present invention can be applied to various products.

In addition, a plurality of algorithms may be stored in the flow control strategy storing unit. When a new algorithm is to be used for evaluating an overload condition of a service node, it is only needed to add the new algorithm into the flow control strategy storing unit or replace the existing algorithms in the flow control strategy storing unit, without the need of making considerable amendments to codes.

It can be understood for a person skilled in the art that the whole or a part of the procedure in methods according to the above embodiments may be carried out by instructing relevant hardware through computer programs, and the computer programs may be stored in a computer-readable storage medium. When being executed, the computer programs may include the procedure in the methods according to the above embodiment. The storage medium may be magnetic disk, optical disk, Read-Only Memory (ROM), Random Access Memory (RAM), and so on.

The above description only relates to the preferred embodiments of the present invention. It should be noted that, a person skilled in the art may make various improvements and modifications without departing from the principle of the present invention, and these improvements and modifications should be construed as falling within the protection scope of the present invention.

What is claimed is:

1. A flow control method, wherein the method is applied in a network architecture separated from a service processing system, wherein the method is implemented by a flow control apparatus comprising a processor, comprising:

obtaining a operating status, which is currently monitored, of a service node in the service processing system;

obtaining an evaluating result based on the operating status which is currently monitored and one or more flow control algorithms; and controlling new services arriving at the service processing system based on the evaluating result;

wherein obtaining the evaluating result based on the operating status which is currently monitored and the one or more flow control algorithms comprises: obtaining the evaluating result by comparing the operating status, which is currently monitored, of the service node with a previously-obtained operating status of the service node;

wherein, the method further comprises:

generating a flow control command for decreasing a proportion of new services which are abandoned or stopping abandoning any new service, if the evaluating result indicates that the operating status currently monitored is better than the previously-obtained operating status and the performing unit has been previously required to start to abandon the new services; and generating the flow control command for increasing the proportion of the new services which are abandoned or starting to abandon the new services, if the evaluating result indicates that the operating status which is currently monitored is worse than the previously-obtained operating status;

wherein controlling the new services arriving at the service processing system based on the evaluating result comprises: controlling the new services arriving at the service processing system based on the flow control command.

2. The flow control method according to claim 1, wherein obtaining the evaluating result based on the operating status which is currently monitored and the one or more flow control algorithms comprises:

obtaining the evaluating result by comparing the operating status, which is currently monitored, of the service node with at least one of the following: a preset overload start threshold a preset overload restore threshold, wherein the preset overload start threshold is used as a criterion for judging whether to abandon the new services, the preset overload restore threshold is used as a criterion for judging whether to decrease a proportion of the new services which are abandoned or stop abandoning any new service, and the preset overload restore threshold is lower than the preset overload start threshold.

3. The flow control method according to claim 2, further comprising:

generating the flow control command for starting to abandon the new services, if the evaluating result indicates that the operating status which is currently monitored reaches or exceeds the preset overload start threshold and it has not been previously required to abandon any new service; and generating the flow control command for stopping abandoning any new service, if the evaluating result indicates that the operating status which is currently monitored reaches or is lower than the preset overload restore threshold and it has been previously required to abandon the new services;

wherein controlling new services arriving at the service processing system based on the evaluating result comprises: controlling new services arriving at the service processing system based on the flow control command.

4. A flow control apparatus, wherein the flow control apparatus is applied in a network architecture separated from a service processing system, and comprises a status monitoring unit, a flow control deciding unit, a flow control strategy storing unit and a performing unit, wherein:

the status monitoring unit is configured to monitor an operating status of a service node in the service processing system and report the operating status, which is currently monitored, of the service node to the flow control deciding unit;

the flow control deciding unit is configured to provide the operating status, which is currently monitored, of the service node to the flow control strategy storing unit, generate a flow control command based on an evaluating result which is obtained by the flow control strategy storing unit based on one or more flow control algorithms, and the operating status, which is currently monitored of the service node, and distribute the flow control command;

the flow control strategy storing unit is configured to store the one or more flow control algorithms, obtain the evaluating result based on the one or more flow control algorithms and the operating status, which is currently monitored, of the service node provided by the flow control deciding unit, and provide the evaluating result to the flow control deciding unit; and the performing unit is configured to control new services arriving at the service processing system according to the flow control command distributed by the flow control deciding unit, wherein the flow control strategy storing unit is configured to obtain the evaluating result based on the one or more flow control algorithms and the operating status, which is currently monitored, of the service node provided by the flow control deciding unit through: obtaining the evaluating result by comparing the operating status, which is currently monitored, of the service node with a previously-obtained operating status of the service node;

wherein the flow control deciding unit is configured to generate the flow control command based on the evaluating result through: generating the flow control command for decreasing a proportion of the new services which are abandoned or stopping abandoning any new service, if the evaluating result indicates that the operating status which is currently monitored is better than the previous-obtained operating status and the performing unit has been previously required to start to abandon the new services; and generating the flow control command for increasing the proportion of the new services which are abandoned or starting to abandon the new services, if the evaluating result indicates that the operating status which is currently monitored is worse than the previous-obtained operating status.

5. The flow control apparatus according to claim 4, wherein the performing unit is configured to control the new services based on the flow control command distributed by the flow control deciding unit through:

requiring the service processing system to accept partial of the new services when the service processing system receives the new services, if the flow control command requires to decrease the proportion of the new services which are abandoned;

requiring the service processing system to accept the new services when the service processing system receives the new services, if the flow control command requires to stop abandoning any new service;

requiring the service processing system to refuse to accept the new services or temporarily store but not process the new services when the service processing system receives the new services, if the flow control command requires to increase the proportion of the new services which are abandoned or start to abandon the new services; and requiring the service processing system to accept or not to accept a number of new services, which correspond to an increased proportion of the new services which are abandoned or a proportion of the new services being abandoned, from a certain number of new services, if the flow control command not only requires to increase the proportion of the new services which are abandoned or start to abandon the new services, but also indicates the increased proportion of the new services which are abandoned or the proportion of the new services being abandoned, wherein not to accept the new services refers to temporarily storing but not processing the new services or refers to refusing to accept the new services.

6. The flow control apparatus according to claim 4, wherein the status monitoring unit, the flow control deciding unit, the flow control strategy storing unit and the performing unit are integrated into a same one process in a form of dynamic link library; or the status monitoring unit, the flow control deciding unit and the performing unit are respectively integrated into different processes in the form of dynamic link library, and the flow control strategy storing unit is integrated into the flow control deciding unit.

7. The flow control apparatus according to claim 4, wherein the operating status, which is currently monitored, of the service node is a load status of the service node or a message processing time of the service node.

* * * * *